Patented Apr. 7, 1931

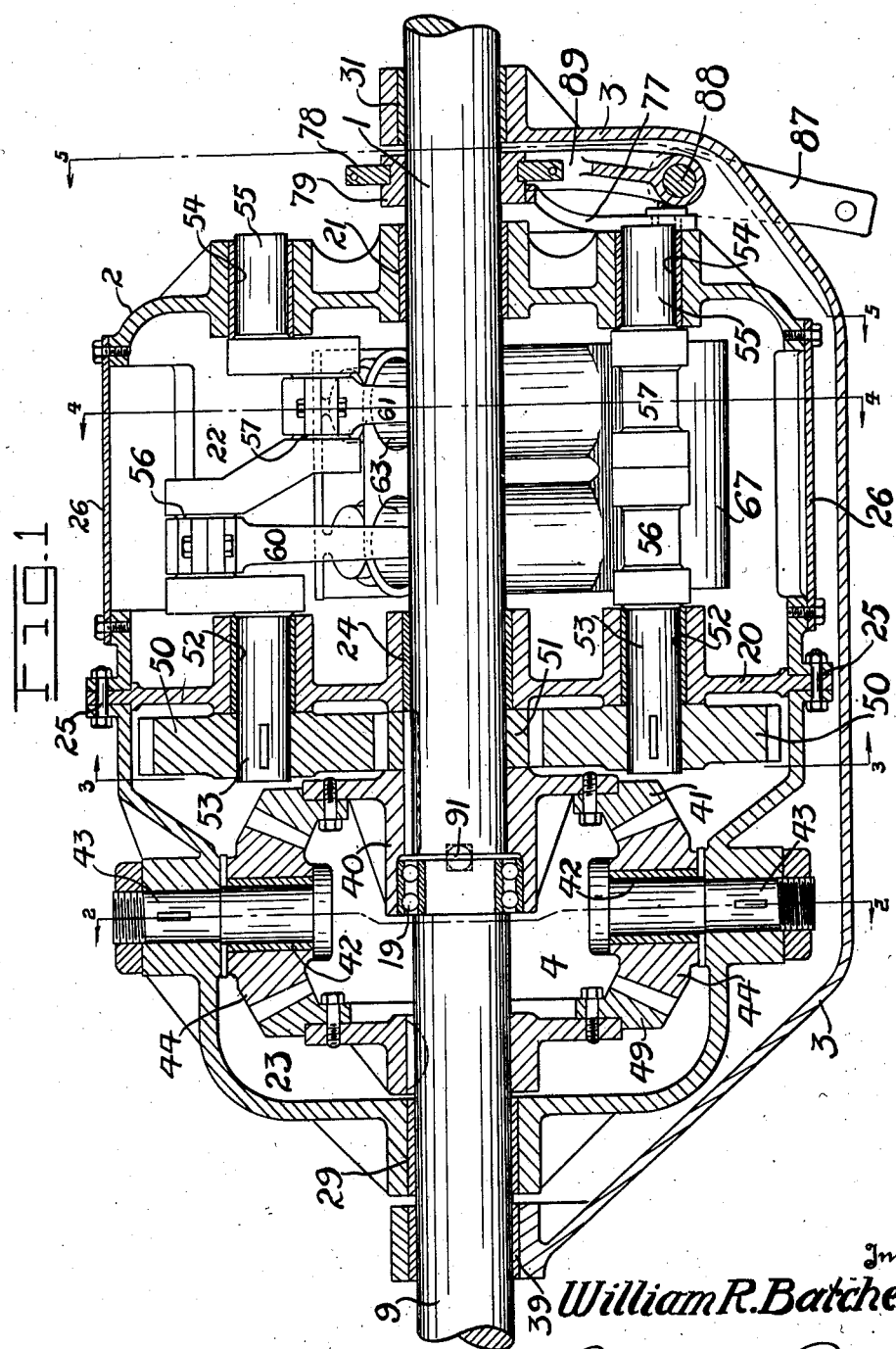

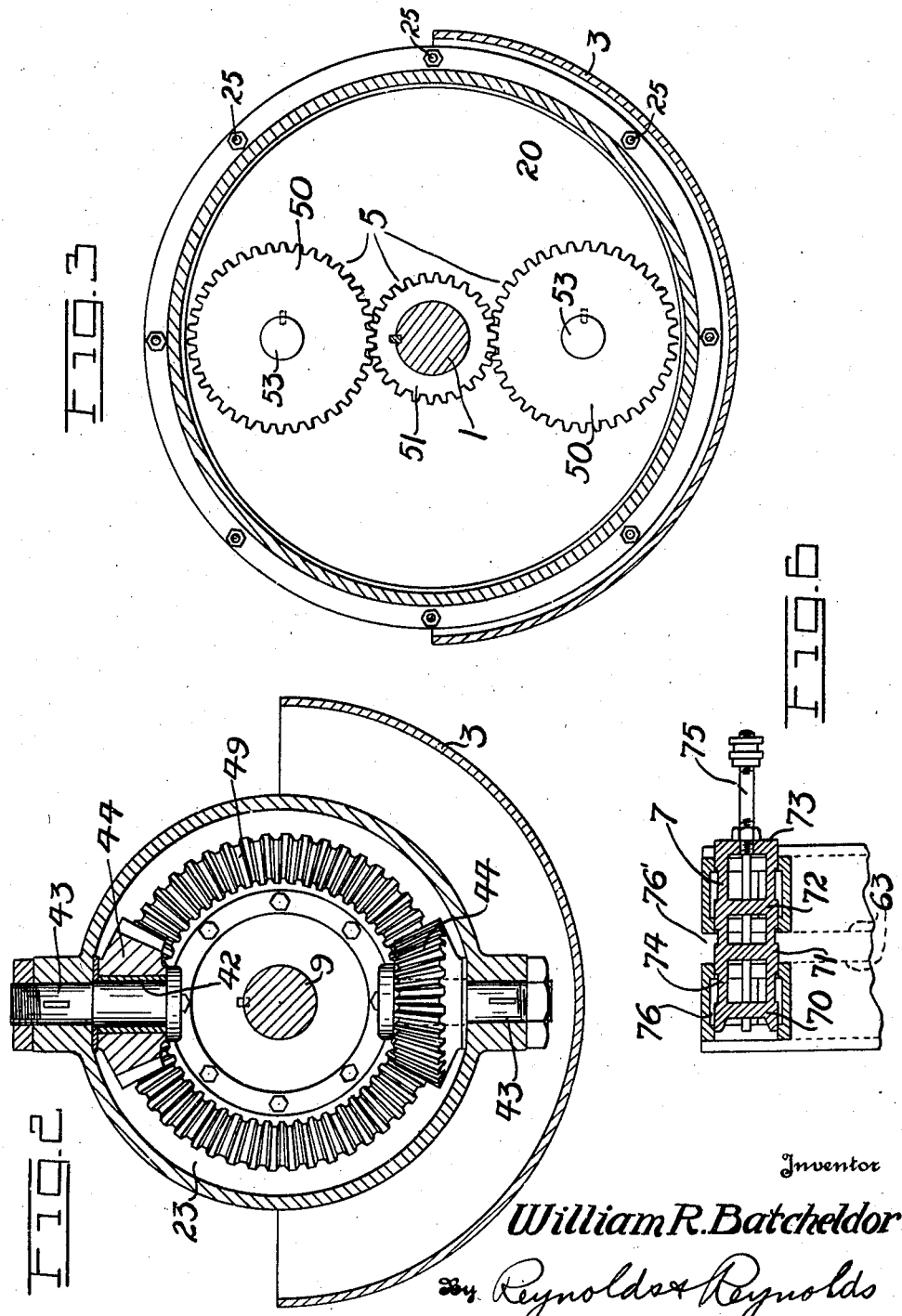

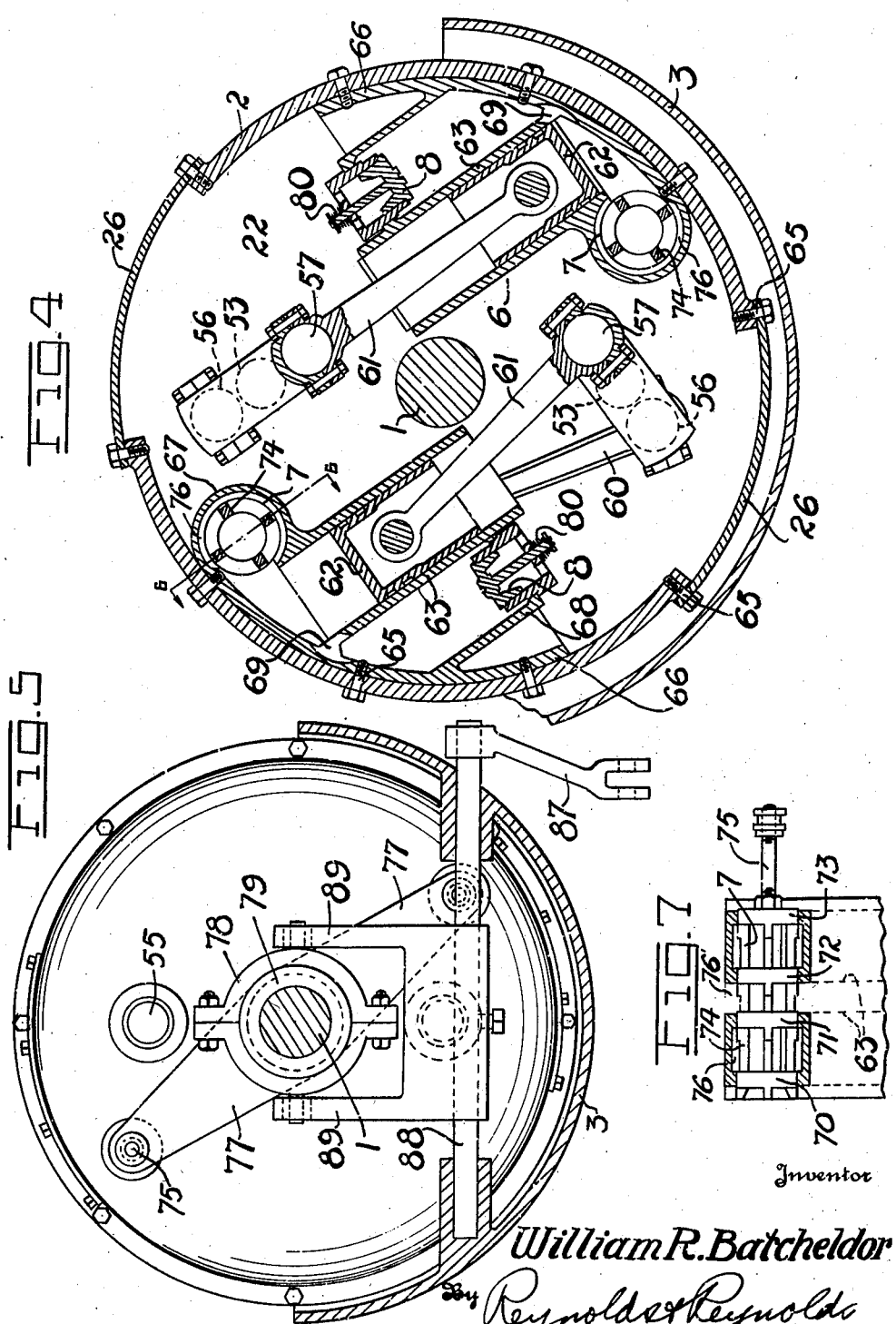

1,799,578

UNITED STATES PATENT OFFICE

WILLIAM R. BATCHELDOR, OF EVERETT, WASHINGTON

CHANGE-SPEED MECHANISM

Application filed January 6, 1930. Serial No. 418,784.

My invention relates to an improvement in power transmission mechanisms, more especially to such a mechanism wherein hydraulic change-speed devices are incorporated.

It is my object to provide a mechanism of the general character indicated, wherein all possible variations of speed between a driving and a driven shaft may be obtained, by a combination of differential gear drive mechanism and hydraulic control mechanism therefor, including the advantages of both.

It is a further object, in such mechanism employing gearing, to provide means whereby the gearing employed may be locked together to produce an ultimate direct drive between the driving and driven shafts, without loss through friction in the gears.

Various other objects, more especially such as pertain more directly to the mechanical construction of the device, will be best ascertained from a study of the accompanying drawings, of this specification, and of the claims.

My invention comprises the novel parts, and the novel combination and arrangement thereof, as shown in the accompanying drawings, described in the specification, and as will be more particularly defined by the claims which terminate the same.

In the accompanying drawings I have shown my invention in a form which is now preferred by me, it being understood that various changes may be made in the detail, form, and arrangement of the several parts which make up my invention, without departing from the scope thereof, as defined in the claims.

Figure 1 is an axial section through my device.

Figures 2, 3, 4, and 5 are, respectively, transverse sections through my device, on the respective lines 2—2, 3—3, 4—4, and 5—5 of Figure 1.

Figures 6 and 7 are sections taken axially of the valve which controls the hydraulic transmission mechanism, taken on the line 6—6 of Figure 4.

In effect, my invention comprises a driving and a driven shaft, connected by differential gear mechanism, the differential pinions being carried by a casing journaled about the two shafts, and said casing having incorporated or embodied within it hydraulic means for controlling the relative rotation between itself and the driving shaft, either permitting rotation of one relative to the other, at a different speed, due to the differential gear mechanism, or locking the casing to the driving shaft, or obtaining any and all variations intermediate these extremes.

The driving shaft 1 and the driven shaft 9 are preferably aligned with one another, and about these is journaled a casing 2. One bearing 21 of the casing 2 rests upon the drive shaft 1, and the other, 29, is shown as resting upon the driven shaft 9. The two shafts are held in alignment, and are supported, by a frame member 3, having the bearings 31 and 39. This frame member is itself supported in any suitable way, not shown.

I prefer that the casing 2 be divided into two chambers 22 and 23, by means of a transverse partition 20. Thus, the partition 20 may have a bearing 24 on one of the shafts, as the driving shaft 1, and the two halves of the casing may be flanged and fitted each to the partition 20, as indicated at 25. The casing 2 may be thus made fluid tight, and may be filled with grease or oil, yet parts are accessible in case of necessity. Cover plates 26 may be employed for inspection of the interior, or for insertion of parts to be described later.

Secured upon the projecting end of the drive shaft 1, and preferably within the chamber 23, is a bevel gear 41. This gear is keyed on to the shaft 1 to rotate therewith, and it offers a convenient means, through the provision of an integral projecting hub 40, for the mounting of a radial antifriction bearing 19 between the abutting ends of the shafts 1 and 9. A thrust bearing at 91 may also be provided. The differential gear mechanism, generally indicated by the numeral 4, is carried in the chamber 23, and comprises, in addition to the gear 41 upon the shaft 1, a like gear 49 keyed upon the shaft 9, and differential pinions 44 carried upon shafts 43, which are supported in the casing 2 to provide journal bearings 42 for the pinions 44 within the casing. As all parts are within the closed chamber 23, the problem of lubrication is easily solved by filling the chamber with lubricant.

In order to control the rotation of the casing 2 from the driving shaft 1, I provide upon the shaft 1 a pinion 51, forming part of a gear train, illustrated in Figure 3, and generally designated by the numeral 5. This pinion 51 is keyed to the shaft 1, and preferably is contained within the chamber 23 of the casing. In mesh with it are pinions 50, carried upon shafts 53, journaled at 52 in the partition 20. Through these pinions 50 the rotation of the casing may be controlled from the drive shaft 1.

Rotation of the driving shaft 1 will cause rotation of the shaft 53, so long as the casing 2 is not rotating at the same speed as the shaft 1.

The shaft 53 is in effect a crank shaft, the opposite end 55 of which is journaled at 54 in the casing 2, at the opposite end of the chamber 22, into which the crank shaft protrudes. To the crankpins 56 and 57 may be connected piston rods 60 and 61, forming part of the hydraulic transmission mechanism, generally designated by the numeral 6, which is supported within the chamber 22. It will be understood that one of the gears 50 and one unit of the hydraulic transmission mechanism would be sufficient, but for the purposes of balance and smoothness of operation, and for elimination of wear and undue stresses, I prefer that at least two units be employed.

The form of these units may vary widely, but I have found a convenient form to consist of the piston 62 within a cylinder 63, the piston being connected by the piston rod 60 or 61 to one of the wrist pins 56 or 57, and the cylinder 63 having formed integral therewith a valve casing 67 for an outlet valve 7, and a valve casing 68 for an intake valve 8. The outlet valve casing 67 is open at its end, and communication is had between the valve casing 68 and the interior of the cylinder 63 through a port 69. The whole unit may be conveniently mounted upon a curved base plate 66, by means of which it is clamped to the interior of the casing 2 by such means as the bolts 65. The unit may be inserted as a whole, or may be inspected, through the opening closed by the plate 26.

The outlet valve 7 is a cylindrical cage consisting of a plurality of spaced imperforate disks 70, 71, 72, and 73, cooperating with identically spaced seats. Connecting these disks are the longitudinal bars 74. A valve stem 75 projects through a suitable packing gland in the end of the casing 2 to a point where it can be controlled by a bridge arm 77 connecting the two valve stems 75, and by other mechanism which will be described hereafter.

The several compartments of the valve, defined by the transverse partitions 70, 71, 72, and 73, are connected through peripheral ports 76 formed in the interior of the valve casing 67. An additional outlet port 76' may be employed in addition to the end port which admits to the interior of the valve 7.

Let us assume that the hydraulic mechanism is in such position that it offers no substantial resistance to the rotation of the crank shaft 53, 55. The valve 7, in such a case, would be in the position shown in Figure 6. Since the drive shaft 1 is rotating at a constant speed, and the driven shaft 9 is connected to a load which is to be moved, there must be relative movement of the gears 41 and 49 of the differential mechanism 4, the first rotating and the latter being stationary, and this will influence and cause rotation of the differential pinions 44. As a result, the casing 2 which supports the differential pinions 44 will rotate in the same direction as the drive shaft 1, but at half the speed thereof. Under such circumstances, the mechanism is controlled wholly by the differential gear mechanism 4.

Now let us assume that the valve 7 is moved in such a way as to restrict the discharge, to a slight degree, from the hydraulic mechanism (which heretofore has been running free, the fluid entering and being immediately discharged without substantial resistance). As resistance builds up in the hydraulic mechanism 6 a tendency is produced to lock the gears 50 and 51, and consequently to lock the casing 2 to rotate at the same speed as the drive shaft 1. However, upon first closing the valve 7, the result will be to slightly speed up the casing 2, and this acting through the differential mechanism 4 will commence rotation of the driven shaft 9.

Let us assume that the drive shaft 1 turns at the constant speed of five hundred revolutions per minute. Under free conditions, that is, when the hydraulic mechanism is not in operation, the driven shaft 9 will not turn, but the casing 2 will rotate at two hundred and fifty revolutions per minute. Suppose the valve 7 to be moved in such a way as to produce resistance in the hydraulic mechanism, to such an extent that the casing 2 begins to rotate at two hundred and fifty-one revolutions per minute. The driven shaft 9 will commence to rotate at a speed twice the increase in speed of the casing, or at two revolutions per minute. As resistance is increased in the valve 7 the casing 2 is speeded up, and the shaft 9 is again speeded up, its speed increasing at twice the rate of the increase in speed of the casing.

Eventually, the valve 7 will be closed completely, as is shown in Figure 7, in which case the entire hydraulic mechanism 6 is locked, and this accomplishes, in effect, the locking of the gears 50 and 51, and the casing 2 then commences to turn at the same speed as the driving shaft 1. Since it carries the pinions 44, these in effect lock the gears 41 and 49 together, and the ultimate result is the effective locking of the shafts 1 and 9 together to rotate at the same speed and in the same direction.

The movement of the valves 7 is controlled by the bridge arm 77 heretofore mentioned, outside of the casing 2, and this in turn is made a part of the ring 78 floating in the shifting collar 79 upon the shaft 1. Various means may be employed for shifting the ring 78, and for this purpose I have shown the yoke 89 connected therewith and secured upon the rock shaft 88, the latter being controlled from a distant point by the arm 87.

Various changes in the form and arrangement of the parts may be accomplished within the scope of my invention, as defined by the appended claims.

What I claim as my invention is:

1. In combination with aligned driving and driven shafts, a rotative casing journaled partly upon each of said shafts, driving means operatively connecting said shafts and comprising a gear secured on each shaft and pinions journaled in said casing upon axes radially disposed relative to the driving and driven shafts, and meshing with each of said gears, hydraulic transmission means supported in said casing, and operatively connected by means independent of said pinions to be driven from said driving shaft, and control means for varying the resistance to passage of fluid through said hydraulic transmission between a minimum, approaching zero, to a maximum, approaching infinity.

2. In combination with aligned driving and driven shafts, a rotative casing journaled in part upon each of said shafts, differential gear means directly connecting said shafts, and including pinions journaled in said casing upon axes normal to the driving and driven shafts, and hydraulic means energized independently of said differential means for interposing any selected force in opposition to the rotation of said casing, whereby an infinite number of speed variations of the driven shaft may be obtained from zero to the full speed of the driving shaft, and in the same direction.

3. In combination with aligned driving and driven shafts, a rotative casing comprising two end sections and a transverse intermediary partition clamped together to define two fluid-tight partitions, a differential gear mechanism in one of said chambers comprising two equal gears, one upon the driving shaft and one upon the driven shaft, and differential pinions meshing with each of said gears and supported from the casing, hydraulic change-speed mechanism in the second chamber including valve means for controlling the passage of fluid therethrough, positive means connecting said hydraulic mechanism with the driving shaft, and means operable from a distant point for controlling said valve means.

4. In combination with a driving and a driven shaft, a rotative casing, driving means operatively connecting said shafts and including pinions journaled in said casing, a hydraulic transmission and a driving means therefor including a cylinder and a piston therein, the cylinder being secured in the casing, a crank shaft journaled within the casing and operatively connected to said piston, a gear secured upon the driving shaft, and a gear upon said crank shaft meshing therewith, and control means for varying the resistance to passage of fluid through said hydraulic transmission between a minimum, approaching zero, to a maximum, approaching infinity.

5. In combination with a driving and a driven shaft, a rotative casing, driving means operatively connecting said shafts and including pinions journaled in said casing, a hydraulic transmission and driving means therefor comprising balanced pairs of cylinders secured within the casing and a piston in each cylinder, a crank shaft journaled in the casing corresponding to each pair of cylinders, a gear on each crank shaft, a gear secured on the driving shaft and meshing with all of said crank shaft gears, and valve means simultaneously controlling communication between all of said cylinders and a fluid supply source, to vary the resistance to passage of fluid through the hydraulic transmission between approximately zero and infinity.

6. In combination with a driving and a driven shaft, a rotative casing, driving means operatively connecting said shafts and including pinions journaled in said casing, a hydraulic transmission and a driving means therefor including a cylinder and inlet and outlet valve casings forming a unit therewith, said unit being secured within the casing, a piston reciprocable in the said cylinder, a crank shaft journaled in the casing and operatively connected to said piston, the crank shaft being operatively connected to be driven from the driving shaft through the casing, and valves in said valve casings for varying the resistance to passage of fluid through said hydraulic transmission between a minimum, approaching zero, to a maximum, approaching infinity.

Signed at Seattle, Washington, this 26th day of December, 1929.

WILLIAM R. BATCHELDOR.